United States Patent
Magennis et al.

(10) Patent No.: US 7,392,386 B2
(45) Date of Patent: Jun. 24, 2008

(54) SETUID-FILTER METHOD FOR PROVIDING SECURE ACCESS TO A CREDENTIALS STORE FOR COMPUTER SYSTEMS

(75) Inventors: Gerard Magennis, Glasgow (GB); Thomas Buchendorfer, Glasgow (GB)

(73) Assignee: J P Morgan Chase Bank, New York, NY (US)

( * ) Notice: Subject to any disclaimer, the term of this patent is extended or adjusted under 35 U.S.C. 154(b) by 751 days.

(21) Appl. No.: 10/766,168

(22) Filed: Jan. 28, 2004

(65) Prior Publication Data
US 2005/0166048 A1    Jul. 28, 2005

(51) Int. Cl.
*H04L 9/00*    (2006.01)

(52) U.S. Cl. ............ 713/168; 713/182; 726/6; 709/225

(58) Field of Classification Search ............ 713/168
See application file for complete search history.

(56) References Cited

U.S. PATENT DOCUMENTS

| | | |
|---|---|---|
| 3,896,266 A | 7/1975 | Waterbury |
| 3,938,091 A | 2/1976 | Atalla et al. |
| 4,321,672 A | 3/1982 | Braun et al. |
| 4,567,359 A | 1/1986 | Lockwood |
| 4,633,397 A | 12/1986 | Macco |
| 4,695,880 A | 9/1987 | Johnson et al. |
| 4,696,491 A | 9/1987 | Stenger |
| 4,713,761 A | 12/1987 | Sharpe et al. |
| 4,725,719 A | 2/1988 | Oncken et al. |
| 4,745,468 A | 5/1988 | Von Kohorn |
| 4,799,156 A | 1/1989 | Shavit |
| 4,823,264 A | 4/1989 | Deming |
| 4,882,675 A | 11/1989 | Nichtberger |
| 4,926,255 A | 5/1990 | Von Kohorn |
| 4,964,043 A | 10/1990 | Galvin |
| 4,992,940 A | 2/1991 | Dworkin |

(Continued)

FOREIGN PATENT DOCUMENTS

DE    19731293    1/1999

(Continued)

OTHER PUBLICATIONS

Anne Knowles; Improved Internet Security Enabling On-Line Commerce; Mar. 20, 1995;PC Week.

(Continued)

*Primary Examiner*—Kambiz Zand
*Assistant Examiner*—Yonas Bayou
(74) *Attorney, Agent, or Firm*—Lowenstein Sandler PC

(57) ABSTRACT

A method that provides access to Privileged Accounts to users by way of a two-way-encrypted credential store. In accordance with this invention, a process that needs to retrieve credentials for a third party system causes the operating system to launch a second process. This second process runs under a secured user id without interactive access. The requesting process can then pass generalized command streams to the second process, including tokenized credential retrieval requests. These tokenized credential retrieval requests are processed to authenticate the requests, perform audit logging of requests and retrieval of credentials. Tokenized credential requests transformed by the second process into credentials, which can be embedded within a command stream and then either forwarded to a sub-process or returned to the requesting process.

12 Claims, 8 Drawing Sheets

U.S. PATENT DOCUMENTS

| | | | |
|---|---|---|---|
| 5,016,270 A | 5/1991 | Katz |
| 5,050,207 A | 9/1991 | Hitchcock |
| 5,084,816 A | 1/1992 | Boese |
| 5,157,717 A | 10/1992 | Hitchcock |
| 5,220,501 A | 6/1993 | Lawlor |
| 5,233,654 A | 8/1993 | Harvey |
| 5,265,033 A | 11/1993 | Vajk |
| 5,317,683 A | 5/1994 | Hager et al. |
| 5,321,841 A | 6/1994 | East |
| 5,351,186 A | 9/1994 | Bullock |
| 5,412,708 A | 5/1995 | Katz |
| 5,420,405 A | 5/1995 | Chasek |
| 5,446,740 A | 8/1995 | Yien |
| 5,450,134 A | 9/1995 | Legate |
| 5,450,537 A | 9/1995 | Hirai et al. |
| 5,467,269 A | 11/1995 | Flaten |
| 5,473,143 A | 12/1995 | Vak |
| 5,473,732 A | 12/1995 | Chang |
| 5,485,370 A | 1/1996 | Moss et al. |
| 5,511,117 A | 4/1996 | Zazzera |
| 5,532,920 A | 7/1996 | Hartrick |
| 5,534,855 A | 7/1996 | Shockley et al. |
| 5,537,314 A | 7/1996 | Kanter |
| 5,537,437 A | 7/1996 | Kaku et al. |
| 5,544,086 A | 8/1996 | Davis |
| 5,546,452 A | 8/1996 | Andrews |
| 5,551,021 A | 8/1996 | Harada |
| 5,557,334 A | 9/1996 | Legate |
| 5,557,518 A | 9/1996 | Rosen |
| 5,568,489 A | 10/1996 | Yien |
| 5,570,295 A | 10/1996 | Isenberg |
| 5,570,465 A | 10/1996 | Tsakanikas |
| 5,576,951 A | 11/1996 | Lockwood |
| 5,583,778 A | 12/1996 | Wind |
| 5,590,197 A | 12/1996 | Chen |
| 5,592,378 A | 1/1997 | Cameron |
| 5,592,560 A | 1/1997 | Deaton et al. |
| 5,594,837 A | 1/1997 | Noyes |
| 5,598,557 A | 1/1997 | Doner |
| 5,602,936 A | 2/1997 | Green et al. |
| 5,603,025 A | 2/1997 | Tabb |
| 5,606,496 A | 2/1997 | D'Agostino |
| 5,621,201 A | 4/1997 | Langhans |
| 5,621,789 A | 4/1997 | McCalmont |
| 5,621,812 A | 4/1997 | Deaton et al. |
| 5,625,767 A | 4/1997 | Bartell |
| 5,634,101 A | 5/1997 | Blau |
| 5,638,457 A | 6/1997 | Deaton et al. |
| 5,640,577 A | 6/1997 | Scharmer |
| 5,642,419 A | 6/1997 | Rosen |
| 5,644,493 A | 7/1997 | Motai |
| 5,653,914 A | 8/1997 | Holmes et al. |
| 5,657,383 A | 8/1997 | Gerber |
| 5,659,165 A | 8/1997 | Jennings |
| 5,664,115 A | 9/1997 | Fraser |
| 5,666,493 A | 9/1997 | Wojcik et al. |
| 5,671,285 A | 9/1997 | Newman |
| 5,675,637 A | 10/1997 | Szlam et al. |
| 5,675,662 A | 10/1997 | Deaton et al. |
| 5,678,046 A | 10/1997 | Cahill et al. |
| 5,682,524 A | 10/1997 | Freund |
| 5,684,870 A | 11/1997 | Maloney |
| 5,692,132 A | 11/1997 | Hogan |
| 5,699,528 A | 12/1997 | Hogan |
| 5,703,344 A | 12/1997 | Bezy |
| 5,710,886 A | 1/1998 | Christensen |
| 5,710,887 A | 1/1998 | Chelliah |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,715,402 A | 2/1998 | Popolo |
| 5,715,450 A | 2/1998 | Ambrose |
| 5,724,424 A | 3/1998 | Gifford |
| 5,727,163 A | 3/1998 | Bezos |
| 5,734,838 A | 3/1998 | Robinson |
| 5,740,231 A | 4/1998 | Cohn et al. |
| 5,754,840 A | 5/1998 | Rivette |
| 5,758,126 A | 5/1998 | Daniels et al. |
| 5,758,328 A | 5/1998 | Giovannoli |
| 5,761,288 A | 6/1998 | Pinard et al. |
| 5,761,647 A | 6/1998 | Boushy |
| 5,761,661 A | 6/1998 | Coussens |
| 5,765,141 A | 6/1998 | Spector |
| 5,765,143 A | 6/1998 | Sheldon |
| 5,774,122 A | 6/1998 | Kojima |
| 5,778,178 A | 7/1998 | Arunachalam |
| 5,784,562 A | 7/1998 | Diener |
| 5,787,403 A | 7/1998 | Randle |
| 5,790,650 A | 8/1998 | Dunn |
| 5,790,785 A | 8/1998 | Klug et al. |
| 5,793,861 A | 8/1998 | Haigh |
| 5,794,178 A | 8/1998 | Caid et al. |
| 5,794,207 A | 8/1998 | Walker et al. |
| 5,794,259 A | 8/1998 | Kikinis |
| 5,796,395 A | 8/1998 | De Hond |
| 5,802,498 A | 9/1998 | Comesanas |
| 5,802,502 A | 9/1998 | Gell |
| 5,805,719 A | 9/1998 | Pare et al. |
| 5,815,657 A | 9/1998 | Williams et al. |
| 5,815,683 A | 9/1998 | Vogler |
| 5,819,092 A | 10/1998 | Ferguson |
| 5,819,285 A | 10/1998 | Damico |
| 5,825,870 A | 10/1998 | Miloslavsky |
| 5,826,241 A | 10/1998 | Stein |
| 5,826,245 A | 10/1998 | Sandberg-Diment |
| 5,826,250 A | 10/1998 | Trefler |
| 5,828,734 A | 10/1998 | Katz |
| 5,832,460 A | 11/1998 | Bednar |
| 5,832,476 A | 11/1998 | Tada |
| 5,835,087 A | 11/1998 | Herz |
| 5,835,580 A | 11/1998 | Fraser |
| 5,835,603 A | 11/1998 | Coutts |
| 5,838,906 A | 11/1998 | Doyle |
| 5,842,178 A | 11/1998 | Giovannoli |
| 5,842,211 A | 11/1998 | Horadan |
| 5,844,553 A | 12/1998 | Hao |
| 5,845,259 A | 12/1998 | West |
| 5,845,260 A | 12/1998 | Nakano et al. |
| 5,847,709 A | 12/1998 | Card |
| 5,848,143 A | 12/1998 | Andrews |
| 5,848,427 A | 12/1998 | Hyodo |
| 5,852,812 A | 12/1998 | Reeder |
| 5,862,223 A | 1/1999 | Walker |
| 5,864,830 A | 1/1999 | Armetta |
| 5,870,718 A | 2/1999 | Spector |
| 5,870,724 A | 2/1999 | Lawlor |
| 5,870,725 A | 2/1999 | Belinger et al. |
| 5,873,072 A | 2/1999 | Kight |
| 5,873,096 A | 2/1999 | Lim |
| 5,880,769 A | 3/1999 | Nemirofsky |
| 5,883,810 A | 3/1999 | Franklin |
| 5,884,032 A | 3/1999 | Bateman |
| 5,884,288 A | 3/1999 | Chang |
| 5,889,863 A | 3/1999 | Weber |
| 5,892,900 A | 4/1999 | Ginter et al. |
| 5,898,780 A | 4/1999 | Liu et al. |
| 5,899,982 A | 5/1999 | Randle |
| 5,903,881 A | 5/1999 | Schrader |
| 5,910,988 A | 6/1999 | Ballard |
| 5,913,202 A | 6/1999 | Motoyama |
| 5,914,472 A | 6/1999 | Foladare et al. |
| 5,915,244 A | 6/1999 | Jack et al. |
| 5,918,214 A | 6/1999 | Perkowski |

| | | |
|---|---|---|
| 5,918,217 A | 6/1999 | Maggioncalda |
| 5,918,239 A | 6/1999 | Allen et al. |
| 5,920,847 A | 7/1999 | Kolling et al. |
| 5,926,812 A | 7/1999 | Hilsenrath et al. |
| 5,930,764 A | 7/1999 | Melchione |
| 5,933,816 A | 8/1999 | Zeanah et al. |
| 5,933,817 A | 8/1999 | Hucal |
| 5,933,823 A | 8/1999 | Cullen |
| 5,933,827 A | 8/1999 | Cole et al. |
| 5,940,812 A | 8/1999 | Tengel et al. |
| 5,943,656 A | 8/1999 | Crooks |
| 5,950,173 A | 9/1999 | Perkowski |
| 5,952,639 A | 9/1999 | Ohki et al. |
| 5,952,641 A | 9/1999 | Korshun |
| 5,953,710 A | 9/1999 | Fleming |
| 5,958,007 A | 9/1999 | Lee et al. |
| 5,960,411 A | 9/1999 | Hartman et al. |
| 5,961,593 A | 10/1999 | Gabber et al. |
| 5,963,635 A | 10/1999 | Szlam et al. |
| 5,963,925 A | 10/1999 | Kolling et al. |
| 5,963,952 A | 10/1999 | Smith |
| 5,963,953 A | 10/1999 | Cram et al. |
| 5,966,695 A | 10/1999 | Melchione et al. |
| 5,966,699 A | 10/1999 | Zandi |
| 5,969,318 A | 10/1999 | Mackenthun |
| 5,970,478 A | 10/1999 | Walker et al. |
| 5,970,482 A | 10/1999 | Pham |
| 5,970,483 A | 10/1999 | Evans |
| 5,987,434 A | 11/1999 | Libman |
| 5,991,751 A | 11/1999 | Rivette et al. |
| 5,991,780 A | 11/1999 | Rivette |
| 5,995,948 A | 11/1999 | Whitford |
| 5,999,907 A | 12/1999 | Donner |
| 6,003,762 A | 12/1999 | Hayashida |
| 6,005,939 A | 12/1999 | Fortenberry et al. |
| 6,006,249 A | 12/1999 | Leong |
| 6,009,442 A | 12/1999 | Chen et al. |
| 6,012,088 A | 1/2000 | Li et al. |
| 6,014,636 A | 1/2000 | Reeder |
| 6,014,638 A | 1/2000 | Burge et al. |
| 6,016,810 A | 1/2000 | Ravenscroft |
| 6,018,714 A | 1/2000 | Risen, Jr. |
| 6,026,429 A | 2/2000 | Jones et al. |
| 6,032,147 A | 2/2000 | Williams et al. |
| 6,049,835 A | 4/2000 | Gagnon |
| 6,055,637 A | 4/2000 | Hudson et al. |
| 6,061,665 A | 5/2000 | Bahreman |
| 6,064,987 A | 5/2000 | Walker et al. |
| 6,065,675 A | 5/2000 | Teicher |
| 6,070,147 A | 5/2000 | Harms et al. |
| 6,070,244 A | 5/2000 | Orchier et al. |
| 6,073,105 A | 6/2000 | Sutcliffe et al. |
| 6,073,113 A | 6/2000 | Guinan |
| 6,076,072 A | 6/2000 | Libman |
| 6,081,790 A | 6/2000 | Rosen |
| 6,081,810 A | 6/2000 | Rosenzweig et al. |
| 6,085,168 A | 7/2000 | Mori et al. |
| 6,088,683 A | 7/2000 | Jalili |
| 6,088,700 A | 7/2000 | Larsen et al. |
| 6,091,817 A | 7/2000 | Bertina et al. |
| 6,095,412 A | 8/2000 | Bertina et al. |
| 6,098,070 A | 8/2000 | Maxwell |
| 6,101,486 A | 8/2000 | Roberts et al. |
| 6,104,716 A | 8/2000 | Crichton et al. |
| 6,111,858 A | 8/2000 | Greaves et al. |
| 6,112,181 A | 8/2000 | Shear et al. |
| 6,115,690 A | 9/2000 | Wong |
| 6,128,602 A | 10/2000 | Northington et al. |
| 6,131,810 A | 10/2000 | Weiss et al. |
| 6,134,549 A | 10/2000 | Regnier et al. |
| 6,138,118 A | 10/2000 | Koppstein et al. |
| 6,144,946 A | 11/2000 | Iwamura |
| 6,144,948 A | 11/2000 | Walker et al. |
| 6,145,086 A | 11/2000 | Bellemore |
| 6,148,293 A | 11/2000 | King |
| 6,151,584 A | 11/2000 | Papierniak et al. |
| 6,154,750 A | 11/2000 | Roberge et al. |
| 6,161,182 A | 12/2000 | Nadooshan |
| 6,170,011 B1 | 1/2001 | Macleod Beck et al. |
| 6,185,242 B1 | 2/2001 | Arthur et al. |
| 6,189,029 B1 | 2/2001 | Fuerst |
| 6,195,644 B1 | 2/2001 | Bowie |
| 6,199,077 B1 | 3/2001 | Inala et al. |
| 6,201,948 B1 | 3/2001 | Cook et al. |
| 6,202,005 B1 | 3/2001 | Mahaffey |
| 6,202,054 B1 | 3/2001 | Lawlor et al. |
| 6,226,623 B1 | 5/2001 | Schein et al. |
| 6,227,447 B1 | 5/2001 | Campisano |
| 6,266,683 B1 | 7/2001 | Yehuda et al. |
| 6,298,356 B1 | 10/2001 | Jawahar et al. |
| 6,308,274 B1 | 10/2001 | Swift |
| 6,327,578 B1 | 12/2001 | Linehan |
| 6,349,242 B2 | 2/2002 | Mahaffey |
| 6,418,457 B1 | 7/2002 | Schmidt et al. |
| 6,438,594 B1 | 8/2002 | Bowman-Amuah |
| 6,493,677 B1 | 12/2002 | von Rosen et al. |
| 6,493,685 B1 | 12/2002 | Ensel et al. |
| 6,510,523 B1 | 1/2003 | Perlman |
| 6,532,284 B2 | 3/2003 | Walker et al. |
| 6,535,855 B1 | 3/2003 | Cahill et al. |
| 6,535,980 B1 | 3/2003 | Kumar |
| 6,557,039 B1 | 4/2003 | Leong et al. |
| 6,609,113 B1 | 8/2003 | O'Leary et al. |
| 6,609,125 B1 | 8/2003 | Layne et al. |
| 6,618,579 B1 | 9/2003 | Smith et al. |
| 6,623,415 B2 | 9/2003 | Gates et al. |
| 6,772,146 B2 | 8/2004 | Khemlani et al. |
| 6,775,783 B1 * | 8/2004 | Trostle ............................. 726/6 |
| 2001/0012974 A1 | 8/2001 | Mahaffey |
| 2001/0054003 A1 | 12/2001 | Chien et al. |
| 2002/0010599 A1 | 1/2002 | Levison |
| 2002/0019938 A1 | 2/2002 | Aarons |
| 2002/0059141 A1 | 5/2002 | Davies et al. |
| 2002/0077978 A1 | 6/2002 | O'Leary et al. |
| 2003/0018915 A1 | 1/2003 | Stoll |
| 2003/0084647 A1 | 5/2003 | Smith et al. |
| 2003/0088552 A1 | 5/2003 | Bennett et al. |
| 2003/0115160 A1 | 6/2003 | Nowlin et al. |
| 2003/0119642 A1 | 6/2003 | Gates et al. |
| 2003/0154403 A1 | 8/2003 | Keinsley |
| 2003/0177067 A1 | 9/2003 | Cowell et al. |

FOREIGN PATENT DOCUMENTS

| | | |
|---|---|---|
| EP | 0559313 | 9/1993 |
| EP | 0884877 | 12/1998 |
| EP | 0917119 | 5/1999 |
| WO | WO 97/43736 | 11/1997 |
| WO | WO 99/52051 | 10/1999 |
| WO | WO 00/68858 | 11/2000 |
| WO | WO 01/35355 | 5/2001 |
| WO | WO 01/43084 | 6/2001 |

OTHER PUBLICATIONS

Anne Thomas; Enterprise Javabeans(TM) Technology: Server Component Model for the Java(TM) platform; May 21, 1999; Internet; Document; java.sun.com.

Anonymous; Aversion Therapy: Banks Overcoming Fear of the 'Net to Develop Safe Internet-based Payment System w/Netscape Communicator; Dec. 12, 1994; Network World.

Anonymous; Corba Overview; May 25, 1999; Internet; arch2.htm at pent21.infosys.tuwien.ac.at.

Anonymous; Overview of CORBA; May 25, 1999; Internet.

Bank, David; Cash, Check, Charge—What's Next?; Mar. 6, 1995;Seattle Times.

Chester; Cross-platform integration with XML and SOAP; Oct 1, 2005.
David Post; E-Cash: Can't Live With It, Can't Live Without It; Mar. 1, 1995;The American Lawyer; p. 116-17.
Don Clark; Microsoft, Visa to Jointly Develop PC Electronic-Shopping Software; Nov. 9, 1994;Wall Street Journal, The; B9.
Echarge Corporation; eCharge; Dec. 3, 1999;web site; www.echarge.com.
FreeMarkets Online, Inc.; FreeMarkets; Apr. 26, 1999;Internet.
GE; Getting Started: Specific GE TPN Post Service Use Guidelines; Apr. 26, 1999;Internet.
GE; Resource Center: Consolidated Edison Selects GE TPN Post; Apr. 26, 1999;Internet.
Gerry Vandenengel; Cards on the Internet: Advertising on a $3 Bill; Feb. 1, 1995;Industry Intelligence.
Harris; Harris InfoSource; Apr. 26, 1999;Internet.
Hewlett-Packard Company; Understanding Product Data Management; Apr. 26, 1999;Website.
Information Today; The check is in the email.; Mar. 1, 1995;Information Today; vol. 12, No. 3, ISSN: 8755-6286.
Java; Applets; May 21, 1999;Internet; java.sun.com.
Java; Banking on Java(TM) Technology; May 21, 1999;Internet; java.sun.com.
Java; Java (TM) Technology in the Real World; May 21, 1999;Internet; java.sun.com.
Java; Java(TM) Remote Method Invocation (RMI) Interface; May 21, 1999;Internet; java.sun.com.
Java; Java(TM) Servlet API; May 21, 1999;Internet; java.sun.com.
Java; Staying in Touch with JNDI; May 21, 1999;Internet; java.sun.com.
Java; The JDBC(TM) Data Access API; May 21, 1999;Internet; java.sun.com.
Jeffrey Kutler; A Different Drummer on the Data Highway; May 12, 1995;American Banker;14+.
Jeffrey Kutler; Cash Card Creator Looking Beyond Mondex; Feb. 9, 1995.
Jepsen; Soap Cleans up interoperability problems on the web; Jan. 1, 2005.
Jonathan Berry et al.; A potent new tool for selling databse: Sep. 5, 0994;Business Week, Cover Story; pp. 56-62.
K. Fujimura et al.; XML Voucher: Generic Voucher Language; Feb. 1, 2003;Internet Draft, Trade Working Group; www.ietf.org.
Kennedy Maize; Fannie Mae on the Web; May 8, 1995;Newsbyte.
Kim A. Strassel; Dutch Software Concern Experiments with Electronic 'Cash' in Cyberspace; Apr. 17, 1995;Wall Street Journal.
Markus Jakobsson et al.; Secure and lightweight advertising on the web; Jun. 21, 1905;Computer Networks; 31 (1999) 1101-1109.

Marvin Sirbu and J.D. Tygar; NetBill: An Internet Commerce System Optimized for Network Delivered Services; Feb. 27, 1995;http://www.ini.cmu.edu:80/netbill; pp. 1-12.
Muse Technologies; Welcome to MUSE; Apr. 26, 1999;Internet.
OMG; Library; May 25, 1999;Internet; www.omg.com.
OMG; Welcome to OMG's CORBA for Beginners Page!; May 25, 1999;Internet; www.omg.co.
OMG; What is CORBA?; May 25, 1999;Internet; www.omg.com.
PDIT; Product Data Integration Technologies, Inc.; Apr. 26, 1999;Internet.
Reuters; Getting Smart with Java: Sun Micro Says American Express to Use Java for Smart Card; Jun. 6, 2000;Internet:; www.abcnew.go.com/sciences/tech.
Richard Mitchell; Netlink Goes After An Unbanked Niche; Sep. 1, 1999;wysiwyg://0/http://www.dialogclassic.com/history; ISSN: 1093-1279.
Robert Barnham; Network Brings Together Producers and Companies.; Feb. 1, 1994;Best's Review.
Robyn Meredith; Internet bank moves closer to virtual reality; May 5, 1995;USA Today.
Russell Mitchell; Cyberspace: Crafting Software . . . ; Feb. 27, 1995;Business Week; 78-86.
SBA; SBA: Pro-Net; Apr. 1, 1999;Internet.
Siebel; Siebel: Ensuring Customer Success; Nov. 17, 1999;Internet; www.siebel.com.
Stephen Eppmt; A Player Goes After Big Bucks in Cyberspace; May 5, 1995;American Banker.
Sun Microsystems, Inc.; Schema for Representing CORBA Objects in an LDAP directory; May 21, 1999;Internet—Draft.
The Gale Group; G&D America's Multi-application Smart Card Selected for Combined Payroll and 'Virtual Banking' Program in Mexico; Apr. 24, 1998;wysiwyg://0/http://www.dialogclassic.com/history; Business Wire, p4241047.
Thomas Publishing Company; SoluSource: For Engineers By Engineers; Apr. 26, 1999;Internet.
Thomas Publishing Company; ThomasNet; Apr. 26, 1999;Internet.
Tracy Pletz and Bill Callahan; Summary of The At Your Request Architecture; Jun. 3, 1999;Document.
Vanessa Houlder; OFT Gives the Individual Top Priority: Report Calls for Deregulation of Business Lending; Jun. 8, 1994;The Financial Times.
Wingspanbank.com; At Your Request; Sep. 28, 1999;Wingspanbank.com.
Yoshitaka Shibata; Seventh International Conference on Parallel and Distributed Systems: Workshops; Jul. 4-7, 2000;IEEE Computer Society.

* cited by examiner

SETUID-FILTER METHOD FOR PROVIDING SECURE ACCESS TO A CREDENTIALS STORE FOR COMPUTER SYSTEMS

FIELD OF THE INVENTION

This invention relates to the field of limiting access to privileged accounts on computer systems, and, more specifically, to a method for providing controlled access to privileged accounts and sensitive data by a process that authenticates access requests, performs audit logging of the requests and retrieval of credentials of the requester in a manner that guards against hacking through the login procedure.

BACKGROUND OF THE INVENTION

Computer security has become a critical issue is today's world. On one hand, enterprises are providing an ever-increasing number of services via computer systems for increasingly sophisticated, real-time transactions. At the same time, hacker break-ins, computer terrorism and employee (or former employee) sabotage is increasing. Thus, there is a tension between the need to keep computer system accessible in order to keep business moving while preventing unauthorized access.

For example, sophisticated transactions involving stocks, bonds, derivatives, futures, etc., and combinations thereof, are executed internationally. These transactions are carried out on one or more secure account on one or more computer systems. Such secure accounts include, but are not limited to, trading services, price-feed services and data-feed services. These secured accounts are referred to herein as "Privileged Accounts." It is clear that Privileged Accounts must be secure to prevent tampering, unauthorized acquisition of private data, etc. It is also clear that that Privileged Accounts must have some form of access to keep these accounts up-to-date and operative to prevent financial loss, incorrect or missing data, unconsummated time-sensitive transactions, etc.

Therefore, there is a need in the art for a secure system and method for accessing Privileged Accounts.

SUMMARY OF THE INVENTION

This problem is solved and a technical advance is achieved in the art by a system and method that provides secure access to a credential store using a setuid-filter. In accordance with this invention, a process that needs to retrieve credentials for a third party system causes the operating system to launch a second process. This second process runs under a secured user id without interactive access using setuid facilities. The requesting process can then pass generalized command streams to the second process, including tokenized credential retrieval requests. These tokenized credential retrieval requests are processed to authenticate the requests, perform audit logging of requests and retrieval of credentials. Tokenized credential requests are transformed by the second process into credentials, which can be embedded within a command stream and then either forwarded to a sub-process or returned to the requesting process.

BRIEF DESCRIPTION OF THE DRAWINGS

A more complete understanding of this invention may be obtained from a consideration of this specification taken in conjunction with the drawings, in which.

DETAILED DESCRIPTION

In general, this invention provides a new way to secure a storage area on a computer system. Only one special user id has access to the secured storage area. An interface process changes its context so that it obtains the permissions of this special user id. The interface process remains a "black box" to the requesting user and other users. Further, there are communications channels with the interface process that also appear as "black boxes" to users. In operation, a data stream is passed through the interface process, which replaces tokenized retrieval requests in the stream with actual credentials. The interface process advantageously implements additional security measures and audit logging.

An exemplary embodiment of this invention is shown in the context of a secured password store a UNIX system using the UNIX "setuid" and "filter" facilities. Alternatives to these facilities, provided by other operating systems, allow one skilled in the art to implement this invention after studying this specification.

An infrastructure for the encrypted password store, which includes data files, is owned and only accessible by a special user id with no interactive access capability. The retrieval interface operates through a "setuid" executable that sets its user id on launch to that of the special store user id using the UNIX setuid facility. The setuid facility protects the retrieval interface program from debugging or interference or control by the requesting user. The setuid program and connected processes share a communications channel through standard UNIX inter-process pipes that cannot be read or debugged by third party processes. Retrieval requests pass, in tokenized form across a pipe that connects the requesting process with the retrieving process. The response is returned across a second pipe to the requesting process or a further processing process (depending on how the requesting process was invoked). This piping of data through the retrieving process is an application of the UNIX filter facility. The application itself may obtain encryption keys using the privileges of the special user id, perform user authorization checks on the requesting user and perform audit logging of requests and responses.

Figure 1:
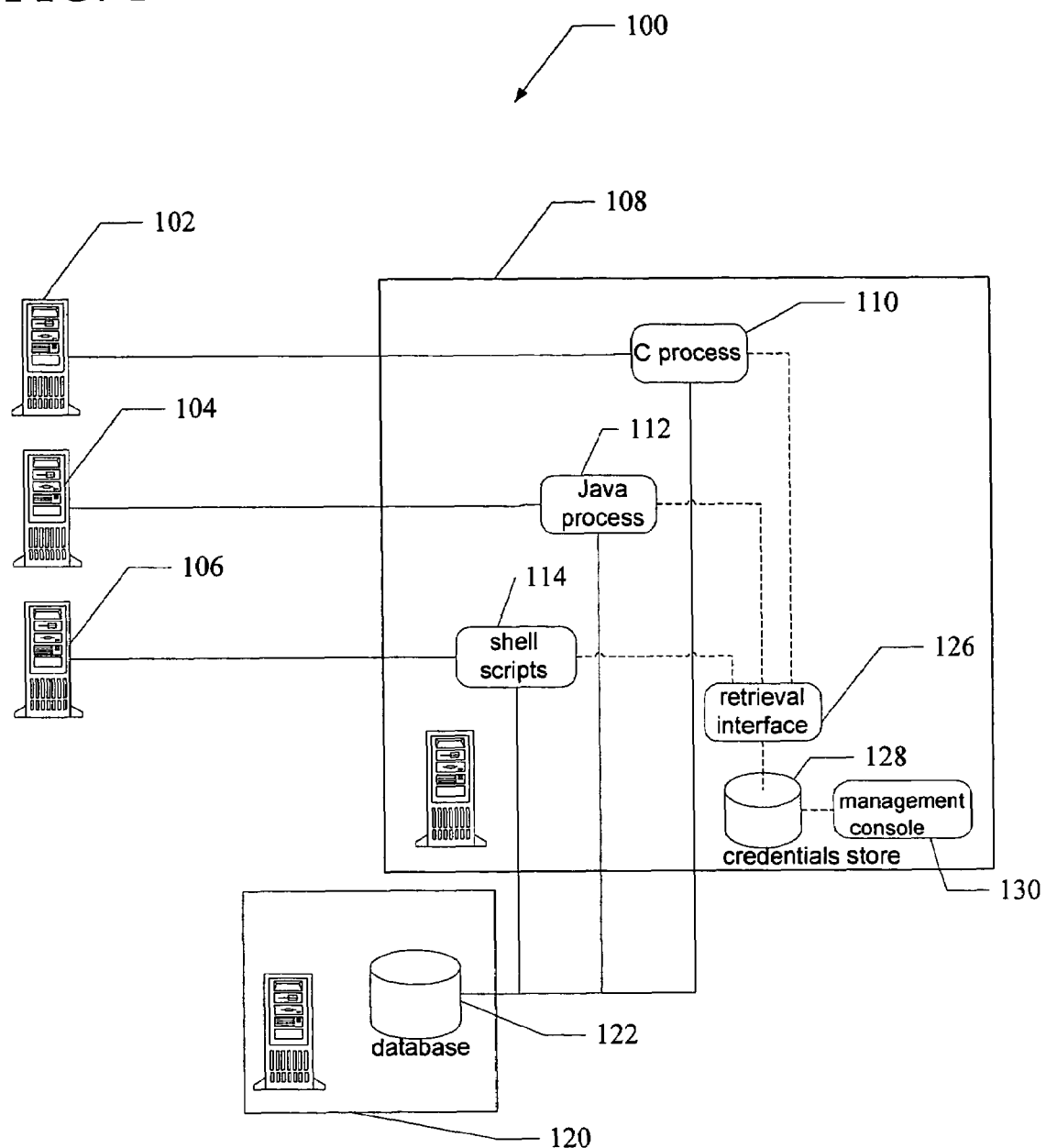
FIG. 1 is a block diagram of a data network in which an exemplary embodiment of this invention may be implemented.

FIG. 1 is a block diagram of an exemplary data network 100 used in effecting data flow and trading of instruments. While this invention is described in terms of a data network used for financial dealings, this invention may be used wherever security is required on a computer system. For example, a server for a web site may employ this invention. Also, a stand-alone system, such as a computer-controlled telephone exchange, may employ this invention. One skilled in the art will appreciate how to implement this invention in widely diverse applications after studying this specification.

Data network 100 comprises, in general, a plurality of users, represented by servers 102, 104 and 106. Each of servers 102, 104 and 106 interact with server 108 in processing, for example, financial transactions. Further, each of servers 102, 104 and 106 communicate with server 108 using different types of processes. For example, server 102 interacts with server 108 using a "C" process 110. Server 104 interacts with server 108 by means of a "Java" process 112 and server 106 interacts with server 108 via shell scripts 114. Each server 102, 104 and 106 needs to interact with data server 120 and database 122 in performing its respective function. Examples of such functions include, but are not limited to, report generation, data feeds and database maintenance batch jobs. However, in order to maintain security of data server 120 and thus database 122, none of servers 102, 104 and 106 has a user id or a password to access database 122.

In accordance with an exemplary embodiment of this invention, processes 110, 112 and 114 communicate with a retrieval interface 126. Each of process 110, 112 and 114 pass one or more tokens to retrieval interface 126. Retrieval interface 126 is the owner of credentials store 128. Retrieval interface 126 receives the tokens from processes 110, 112 and 114 and performs a look up in credential store 128. If the tokens are recognized, then retrieval interface 126 substitutes a user id, password or other information for the tokens and returns the user id, password or other information back to the requesting process. Process 110, 112 and 114 may then access database 122 using the information delivered from retrieval interface 126. The information delivered from retrieval interface 126 is not passed back to servers 102, 104 and 106.

A management console 130 is connected to credentials store 128 in order to provide management and maintenance of the store, as is known in the art.

In the exemplary embodiment of this invention, UNIX is the operating system used in server 108. While this invention is described in terms of the UNIX operating system (and its variants), one skilled in the art will appreciate how to apply the principals of this invention to other operating systems after studying this specification.

In accordance with the exemplary embodiment of this invention, each of processes 110, 112 and 114 starts a session or a UNIX shell script that includes an invocation of the "getpw" command and the user id and password tokens for access to server 120. UNIX recognizes the command "getpw" with the tokens as arguments and spawns a user process, which provides access to credential store 128. The getpw command does not have the same user id as the user's process. Thus, the user cannot invoke the getpw in the debug mode in order to access the data store.

As will be described further, below, in connection with FIGS. 2 and 3, retrieval interface 126 takes the tokens and substitutes therefore a real user id and password. This information is passed to server 120 and the login takes place. In this manner, the user never knows the real user id and password to access server 120, but can access it none the less.

Figure 2:
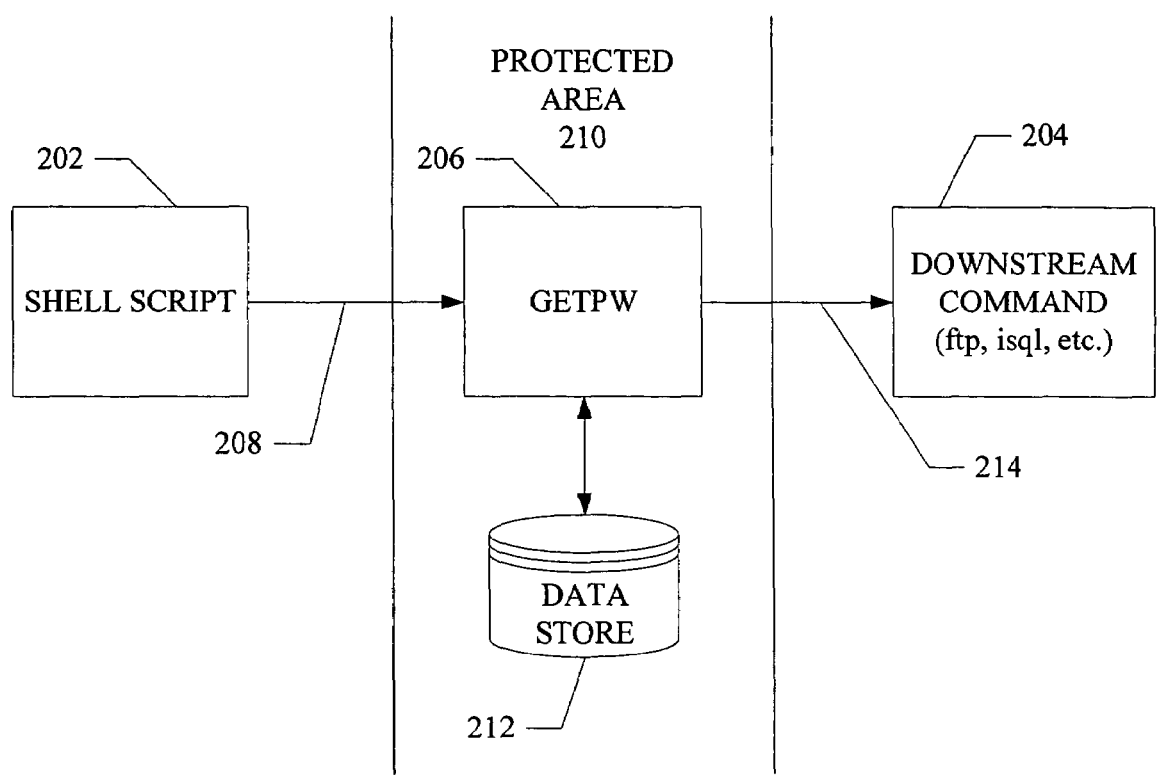
FIG. 2 is a block diagram of processing according to one exemplary embodiment of this invention.

Turning now to FIG. 2, a block diagram of operation of a process in accordance with this invention is illustrated. FIG. 2 illustrates a "pass-through" operation in accordance with one aspect of this invention. A user starts a shell script 202 to execute a downstream command 204 (i.e., ftp, isql, etc.) that requires proper credentials to invoke. According to this aspect of the invention, the process "getpw" 206 is part of a pipeline that converts a data stream. In this instance, the data stream is a short ftp script contained within an overall shell script for sata upload. Table I illustrates an exemplary shell script 202.

TABLE I

Getpw<<EOF | ftp
open server.com
user%ROLEUSER%bloomberg_ftp%
pass%ROLEPASS%bloomberg_ftp%
...
quit
EOF The data stream 208 is passed to getpw 206 as a first filter in the pipeline. At this stage, the data stream has tokenized credentials referenced by role (i.e., "%ROLEUSER%bloomberg_ftp%" and "%ROLEPASS%bloomberg_ftp%"). A "role" is also called a "command" in this exemplary embodiment. Processing proceeds into protected area 210, wherein the user does not have a user id, permissions to read, write, execute, etc. Getpw 206 recognizes the tokens and substitutes data retrieved from data store 212. As part of getpw 206 processing, the tokens are logged for audit purposes. New data stream 214 is passed on to the next part of the pipeline. The pipeline ends with a command 204 that takes data stream 214 as instructions. At this stage, data stream 214 has the proper credentials. Importantly, the proper credentials are only visible to the downstream command 204.

Figure 3:
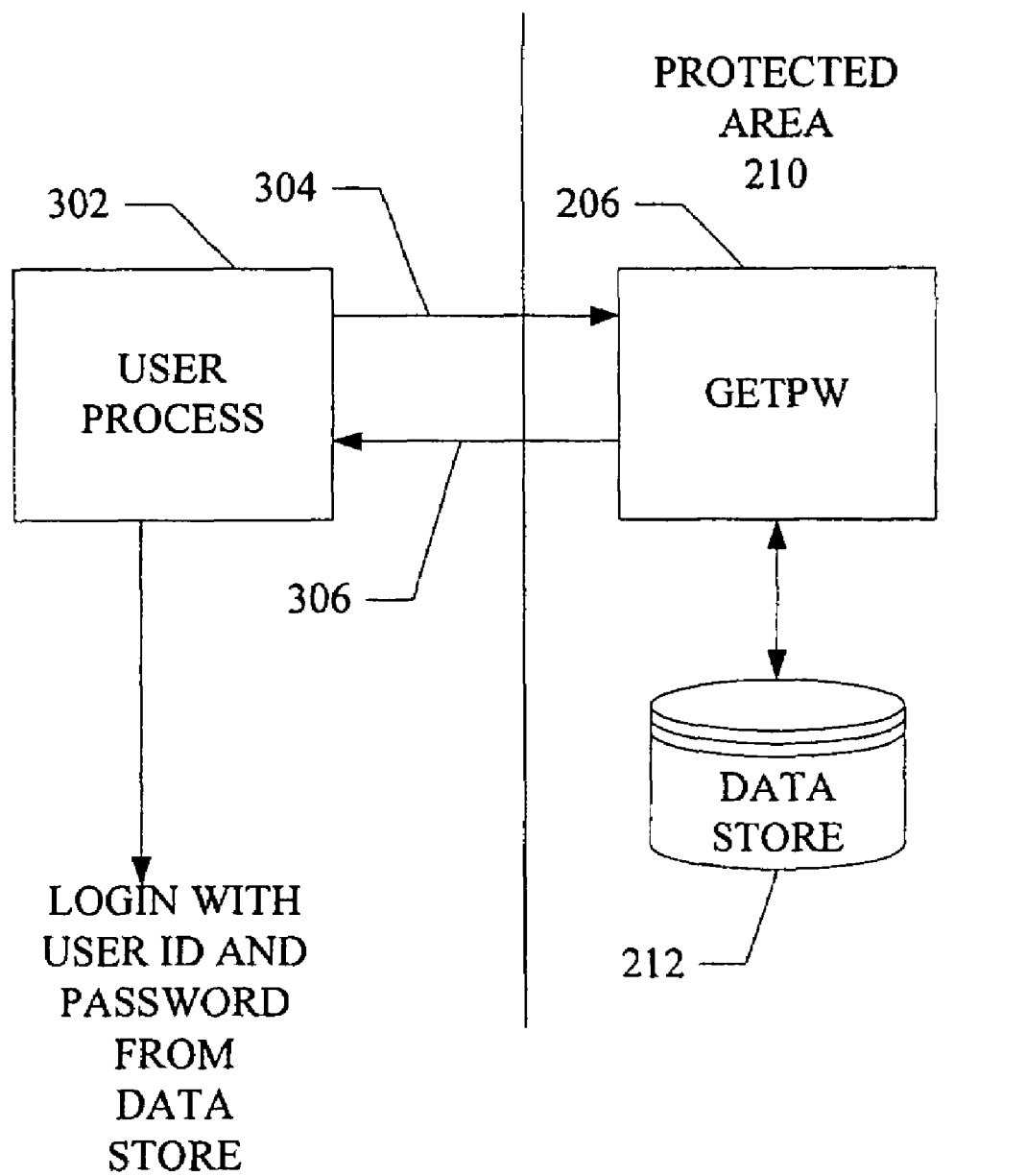
FIG. 3 is a block diagram of processing according to another exemplary embodiment of this invention.

Turning now to FIG. 3, a further aspect of this invention is described in the context of a command line sequence of actions. In this exemplary embodiment, a user process 302 is invoked like a command. A data stream 304 is delivered to getpw 206 in protected area 210. getpw 206 performs its credential look up in data store 212, as described above in connections with FIG. 2, and delivers secured data back to user process 302 on data stream 306. This process may iterate. For example, user process 302 may request a user id and then a password. The user id and password are then passed from user process 302 to, for example, a database login.

While this invention is illustrated in FIG. 2 as three separate blocks, implying three separate processors, the grouping of the blocks is arbitrary. For example, shell script 202 may operate on one process and getpw 206 and downstream command 204 may operate on another. All three processes may operate on the same processor. Further, FIG. 3 is illustrated as two blocks. Blocks 302 and 206 may reside on the same or different processors, or may even be distributed among a plurality of processors. One skilled in the art will appreciate how to structure the processing of a credential store that is advantageous to a specific application after studying this specification.

Figure 4:
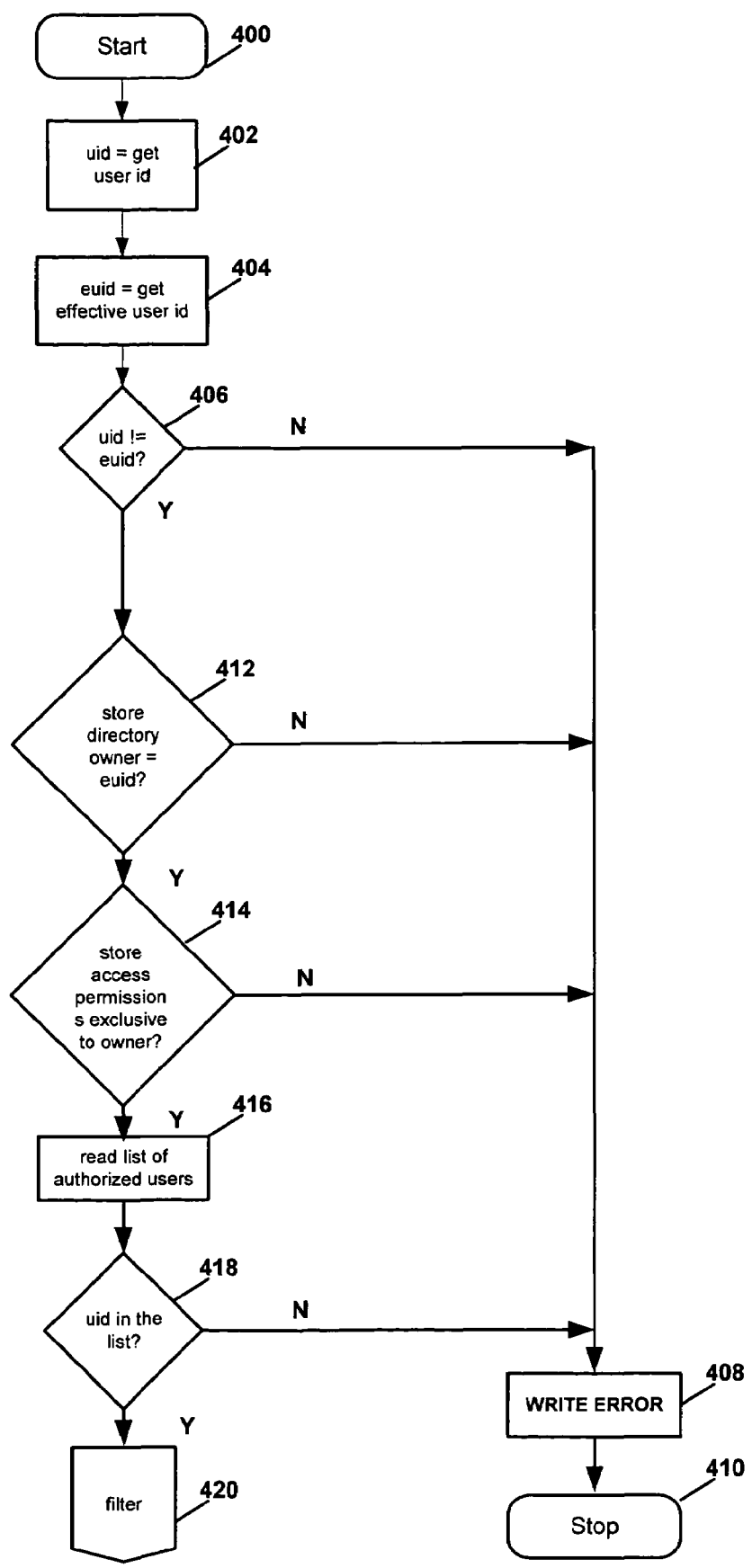
FIGS. 4-10 are flow charts of an exemplary getpw function that implements the block diagrams of FIG. 2 and FIG. 3.

Turning now to FIG. 4, a flow chart describing processing of an exemplary embodiment of getpw 206 is shown. In this exemplary embodiment, the program described by FIG. 4 is installed as SetUID. This algorithm verifies that this program is in fact installed as SetUID, checks the protection of the directory used by the user and checks the authorization of the actual user. Error output comprises "NOAUTH" according to this exemplary embodiment.

Processing begins at oval 400 and moves first to action box 402, where the user id of the user invoking getpw 206 is obtained. Next, in action box 404, the effective user id is obtained. The effective user id comprises, in this exemplary embodiment, the user id of getpw 206. Processing continues to decision diamond 406 where a determination is made whether the user id is not the same as the effective user id. If the user id and the effective user id are the same, then getpw 306 was not properly invoked and processing proceeds to error reporting, box 408, and ends at oval 410.

If, in decision diamond 406, the user id is not the same as the effective user id, then processing proceeds to decision diamond 412. In decision diamond 412, a determination is made whether the data store directory owner is the effective user id. If it is not, then the effective user id is invalid, and processing proceeds to error reporting 408 and ends in oval 410.

If, in decision diamond 412, the data store directory owner is the effective user id, then processing proceeds to decision diamond 414, where a determination is made whether the store access permissions are exclusive to the owner. This check provides further security. If the store access permissions are not exclusive to the owner, then processing proceeds to error reporting 408 and ends in oval 410.

If, in decision diamond 414, the data store access permissions are exclusive to the owner, then processing proceeds to action box 416, where the list of authorized users is read. Processing continues to decision diamond 418, where a determination is made whether the user id is in the list of authorized users. If the user id is not in the list, processing proceeds to error reporting and ends in circle 410. If the user id is in the list, then processing proceeds through connector 420.

Figure 5:
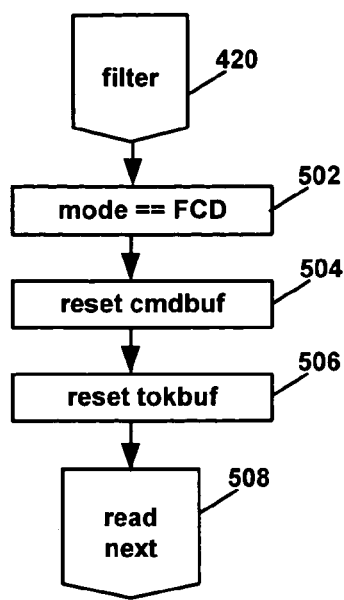

Turning now to FIG. 5, processing from connector 420, "filter," is shown. Getpw uses two buffers, command buffer ("cmdbuf") and token buffer ("tokbuf") as shown in Table 2.

TABLE 2

| d | | command | | d | | | token | | d |
|---|---|---|---|---|---|---|---|---|---|
| % | R | O L E U | ... | % | b | l | o o m | ... | % |
| | | cmdbuf | | | | | tokbuf | | |

The following modes are used in FIG. 5 and subsequent flowcharts: FCD=find command delimiter, FTD=find token delimiter and FED=find ending delimiter.

Getpw also uses three mode variables: find command delimiter ("FCD"), find token delimiter ("FTD") and find ending delimiter ("FED"). Processing in "filter" generally initializes getpw.

Processing starts at connector 420 and moves to action box 502, where the mode is set to FCD. Processing proceeds to action box 504 where the command buffer is reset and then to action box 506, where the token buffer is reset. Processing proceeds through connector 508.

Figure 6:
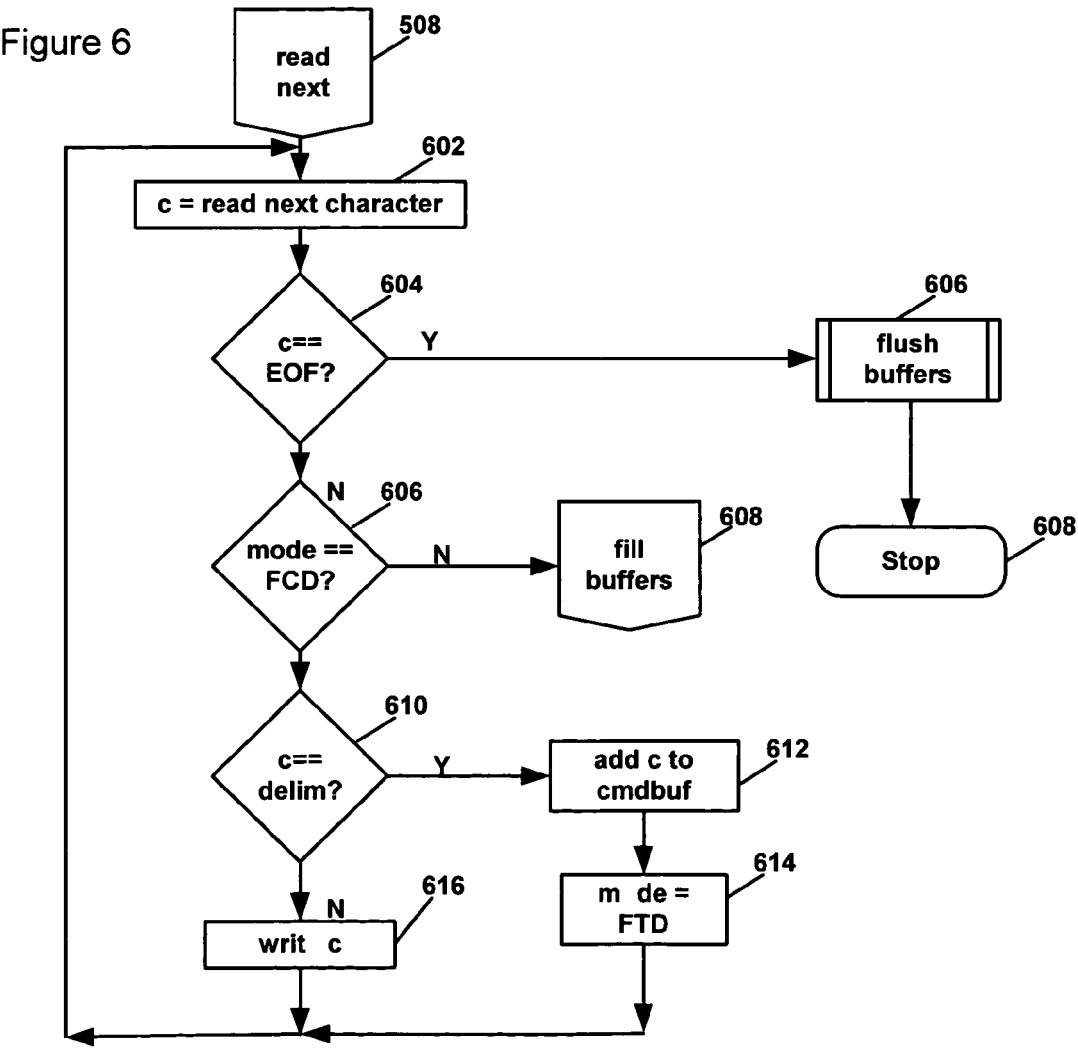

Turning now to FIG. 6, processing from connector 508, "read next," is shown. Processing starts at connector 508 and moves to action box 602, where the next character from the data stream is read. Processing continues to decision diamond 604, where a determination is made whether the character read in box 602 is an "end of file" (EOF) marker. If the character is EOF, then processing proceeds to subroutine 606 where the buffers are clears (described further, below, in connection with FIG. 9). When subroutine 606 returns, processing stops at oval 608.

If, in decision diamond 604, the character read in box 602 is not EOF, then processing continues to decision diamond 606, where a determination is made whether the mode variable is FCD. If the mode variable is not FCD, then processing proceeds to connector 608, where the buffers are filled (described below in connection with FIG. 7).

If, in decision diamond 606, the mode is FCD, then processing moves to decision diamond 610, where a determination is made whether the character read in action box 602 is a delimiter. If the character is a delimiter, then processing proceeds to action box 612, where the character is added to the command buffer. Processing continues to action box 614, where the mode is set to FTD. If, in decision diamond 610, the character is not a delimiter, then the character is written in box 616. Processing proceeds from both box 614 and box 616 to box 602.

Figure 7:
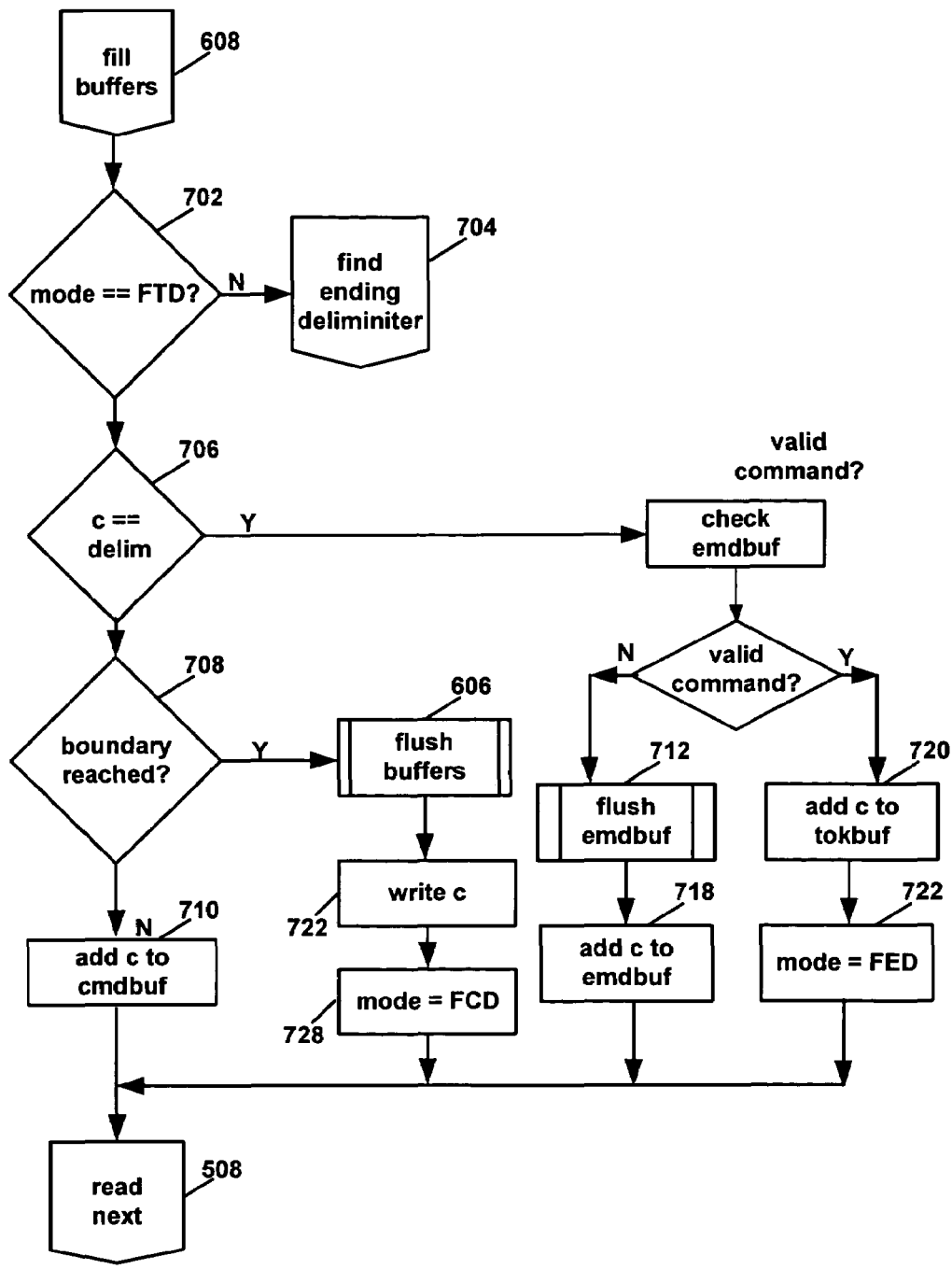

Turning now to FIG. 7, processing at connector 608, "fill buffers," is shown. Processing starts at connector 608 and proceeds to decision diamond 702 where a determination is made whether the mode variable is FTD. If the mode variable is not FTD, then processing proceeds to connector 704, which is described further, below, in connection with FIG. 8.

If, in decision diamond 702, the mode variable is FTD, then processing continues to decision diamond 706. In decision diamond 706, a determination is made whether the character read in step 602 (FIG. 6) is a delimiter. If a delimiter is not detected, then processing proceeds to decision diamond 708, where a determination is made whether a boundary is reached. In accordance with an exemplary embodiment of this invention, a boundary comprises a line break, a buffer full or "\0." If a boundary is not reached in decision diamond 708, then processing proceeds to action box 710, where the character read in step 602 (FIG. 6) is added to the command buffer. Processing continues through connector 508 (FIG. 6, above).

If, in decision diamond 706, the character read in step 602 (FIG. 6) is a delimiter, then processing proceeds to action box 712, where the command buffer is checked. A determination is then made is decision diamond 714 where the command is valid. In accordance with an exemplary embodiment of this invention, valid commands comprise "ROLEUSER," to indicate that the token is a user id or "ROLPASS" to indicate that the token is a password.

If, in decision diamond 714, the command buffer does not have a valid command, then processing flushes the command buffer in subroutine 716 (described below in connection with FIG. 10). Processing continues to action box 718, where the character read in step 602 (FIG. 6) is added to the token buffer. If, in decision diamond 714, the command buffer has a valid command, then the character read in step 602 (FIG. 6) is added to the token buffer in box 720. Next, the mode is set to "FED."

If, in decision diamond 708, a boundary is reached, then the buffers are flushed in subroutine 606 and the character read in step 602 is written to the command buffer in box 726. In box 728, the mode is set to "FCD." Processing from boxes 718, 722 and 728 proceeds to connector 508 (FIG. 6).

Figure 8:
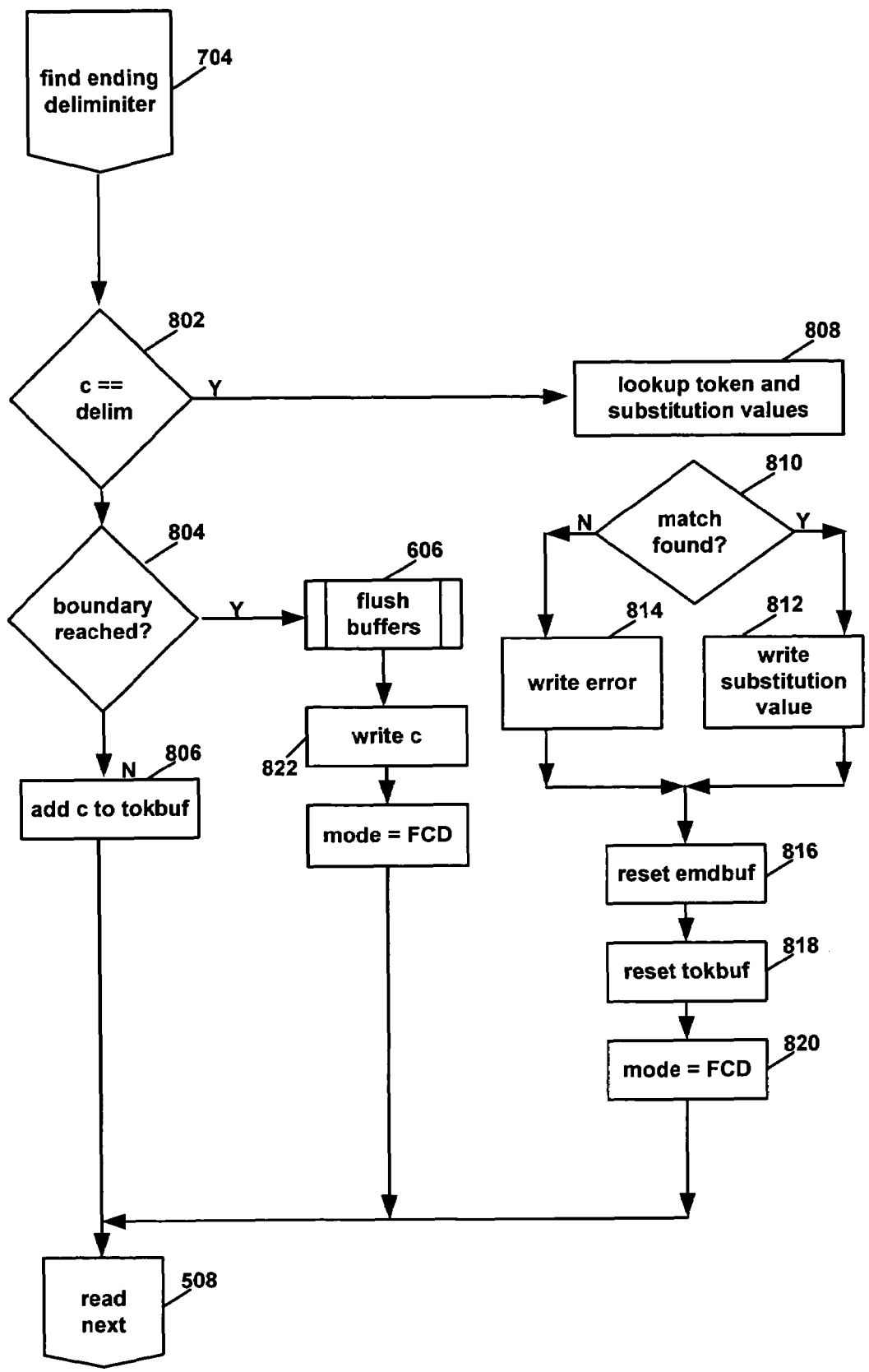

Turning now to FIG. 8, processing from the FED connector 704 is shown. Processing starts at connector 704 and moves to decision diamond 802, where a determination is made whether the character read in step 602 (FIG. 6) is a delimiter. If the character is not a delimiter, then processing moves to decision diamond 804, where a determination is made whether a boundary is reached (as defined above in connection with step 708, FIG. 7). If a boundary is not reached, then the character read in step 602 (FIG. 6) is added to the token buffer in box 806.

If, in decision diamond 802, the character read in step 602 (FIG. 6) is a delimiter, then processing continues to action box 808, wherein a lookup is performed in the data store. If a match is found in decision diamond 810, then the substitute value is written in box 812. Depending on the command that was submitted, the substituted value is a user name or a password. If a match is not found in decision diamond 810, then an error message is written. According to an exemplary embodiment of this invention, if the token was not found then "NOUSER" or "NOPASS" is returned. If there was no recognizable token, then "NOROLE" is returned.

Processing from both box 812 and 814 moves to box 816, wherein the command buffer is reset. Processing continues to box 818 where the token buffer is reset and then to box 820, where the mode is set to FCD.

If, in decision diamond 804, a boundary has been reached, then the buffers are flushed in subroutine 606 (FIG. 9) and the character read in step 602 (FIG. 6) is written in box 822. The mode is set to FCD in box 824. Processing continues from boxes 806, 820 and 824 to connector 508 (FIG. 6).

Figure 9:
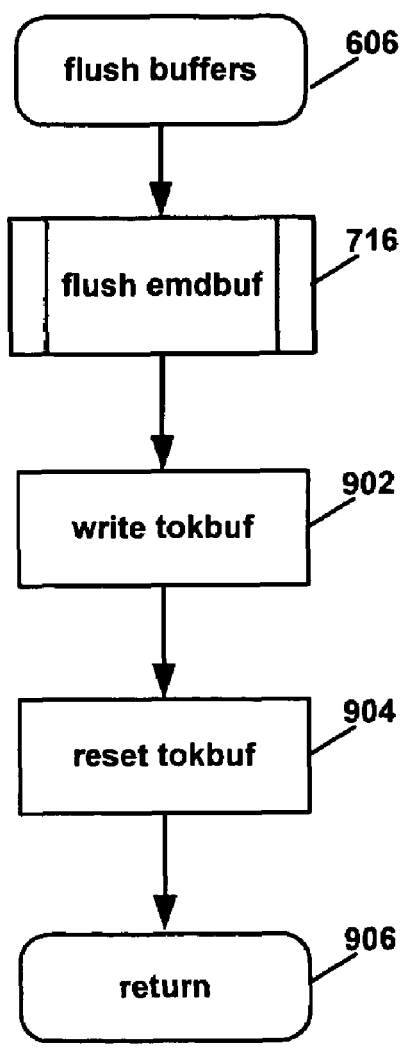

Turning now to FIG. 9, the subroutine flush buffers 606 is shown. Processing begins at connector 606 and proceeds first to the flush command buffer subroutine 716 (FIG. 10). Processing next moves to action box 902, where the token buffer is written. Next, the token buffer is reset in box 904 and the subroutine returns in oval 906.

Figure 10:
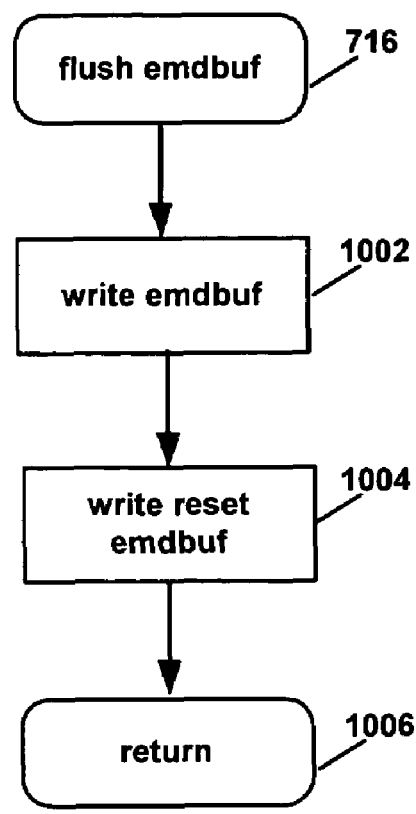

Turning now to FIG. 10, the subroutine flush command buffer 716 is shown. Processing starts at connector 716 and moves to box 1002, where the command buffer is written. In box 1004, the command buffer is reset and the subroutine returns in oval 1006.

It is to be understood that the above-described embodiment is merely illustrative of the present invention and that many variations of the above-described embodiment can be devised by one skilled in the art without departing from the scope of the invention. It is therefore intended that such variations be included within the scope of the following claims and their equivalents.

What is claimed is:

1. A method for use in a computer system that effects secure access to a store, comprising:
    receiving a request to access a store from a first process initiated by a requester;
    initiating a second process responsive to said store access request, wherein data generated by said second process is accessible to said first process but inaccessible to the requester;
    changing a context of said second process to the user id of said store;
    providing said store with an exclusive user id, said exclusive user id being different from a user id of the requestor;
    said second process receiving tokenized credentials corresponding to the user id and password of the requestor from said first process responsive to said request without the use of files and without interaction with said requester;
    said second precess converting the tokenized credentials to the user id and password of the requestor and performing a lookup of said user id and password of the requestor in a credential store;
    said second process passing a user id and password associated with said store to said first process if said user id and password of the requestor are found in said credential store;
    communicating between said first process and said store via inter-process pipes; and
    said first process obtaining data from said store via said inter-process pipes responsive to said store access request using said user id and password associated with said store.

2. A method in accordance with claim 1 further comprising: sending the data responsive to said store access request to a downstream process.

3. A method in accordance with claim 1 farther comprising: logging said store access request.

4. A method in accordance with claim 3 wherein sending the data responsive to said store access request to a downstream process further comprises never sending the data to the requestor.

5. A method in accordance with claim 1 wherein said computer system employs the UNIX operating system and wherein said context changing comprises invoking the UNIX set user id facility.

6. A computer system comprising:
    a data store having an exclusive user id in the computer system;
    a system for providing secure access to said data store, said system being configured to receive a request for access to said data store from a first process initiated by a requester, said exclusive user id being inaccessible to said requester, said exclusive user id being different from a user id of the requestor, said first process being configured to initiate a second process responsive to said request for access to said data store, wherein data generated by said second process is accessible to said first process but inaccessible to the requester, said second process being responsive to said request for access to said data store by changing its user id to the exclusive user id, said second process being operable to receive tokenized credentials corresponding to the user id and password of the recquestor from said first process responsive to said request without the use of files and without interaction with said requester, said second process converting the tokenized credentials to the user id and password of the requestor and being operable to perform a lookup of said user id and password of the requestor in a credential store, said second process being operable to pass a user id and password associated with said data store to said first process if said user id and password of the requestor are found in said credential store; and
    inter-process pipes between said first process and said data store for communicating and responding to requests for data by said first process using said user id and password associated with said data store, said inter-process pipes being inaccessible to the requester.

7. A computer system according to claim 6 wherein the system for providing secure access is further configured to provide data from said data store to a downstream process.

8. A computer system according to claim 6 wherein the system for providing secure access is further configured to log requests for access to said data store.

9. A method for use in a computer system that operates under the UNIX operating system that effects secure access to a store, comprising:
    executing a shell script which creates a data stream containing a tokenized user id and password in order to initiate a request to access a store from a first process initiated by a requester, said tokenized user id and password corresponding to the user id and password of the requestor;
    said first process initiating a second process responsive to said store access request, said second process and said store being in a protected area, wherein data generated by said second process is accessible to said first process but inaccessible to the requester;
    said second process obtaining the tokenized user id and password of the requestor from said first process along said data stream;
    changing a context of said second process to the effective user id of said store using the UNIX set user id facility, said user id of said store being different from a user id of the requestor;
    said second process providing said store with said effective user id, said effective user id being different from said user id of the requestor;
    said second process receiving said tokenized user id and password from said first process responsive to said request without the use of files and without interaction with said requester;

said second process converting the tokens to said user id and password of the requestor and performing a lookup of said user id and password of the requestor in a credential store;

said second process passing a user id and password associated with said store to said first process along a second data stream if said user id and password of the requestor are found in said credential store;

communicating between said first process and said store via a sending inter-process pipe and a receiving inter-process pipe, said first and second inter-process pipes being inaccessible to the requester; and said first process obtaining data from said store via said second inter-process pipe responsive to said store access request via said first inter-process pipe using said user id and password associated with said store;

receiving a request to access a store from a first process initiated by a requester;

initiating a second process responsive to said store access request, wherein data generated by said second process is accessible to said first process but inaccessible to the requester.

10. A method in accordance with claim 9 further comprising:

sending the data responsive to said store access request to a downstream process.

11. A method in accordance with claim 9 further comprising:

logging said store access request.

12. A method in accordance with claim 11 wherein sending the data responsive to said store access request to a downstream process further comprises never sending the data to the requestor.

* * * * *